(12) United States Patent
Redmond

(10) Patent No.: US 9,804,565 B2
(45) Date of Patent: Oct. 31, 2017

(54) APPARATUS AND METHOD FOR DISPLAYING TRANSMISSION AND REFLECTION HOLOGRAMS

(71) Applicant: Ceres Imaging Limited, St. Andrews (GB)

(72) Inventor: Ian Redmond, St. Andrews (GB)

(73) Assignee: Ceres Imaging Limited, St. Andrews (GB)

( * ) Notice: Subject to any disclaimer, the term of this patent is extended or adjusted under 35 U.S.C. 154(b) by 400 days.

(21) Appl. No.: 14/253,733

(22) Filed: Apr. 15, 2014

(65) Prior Publication Data

US 2014/0211287 A1 Jul. 31, 2014

Related U.S. Application Data

(62) Division of application No. 13/142,308, filed as application No. PCT/GB2009/051779 on Dec. 31, 2009.

(30) Foreign Application Priority Data

Dec. 31, 2008 (GB) .................................. 0823686.1

(51) Int. Cl.
G03H 1/22 (2006.01)
G03H 1/04 (2006.01)
G03H 1/26 (2006.01)

(52) U.S. Cl.
CPC ......... *G03H 1/2202* (2013.01); *G03H 1/0408* (2013.01); *G03H 1/22* (2013.01);
(Continued)

(58) Field of Classification Search
CPC ....... G03H 2001/0473; G03H 2222/46; G03H 2227/02; G03H 2227/06; G03H 2250/33; G03H 2270/21; G03H 1/0252; G03H 2001/0216; G03H 2001/2226; G03H 2001/264; G03H 2001/303; G03H 2223/24; G03H 1/04–1/0443; G03H 1/0866; G03H 1/2202; G03H 1/2205; G03H 2001/00; G03H 2001/0208; G03H 2001/0866; G03H 2001/22–2001/2207;
(Continued)

(56) References Cited

U.S. PATENT DOCUMENTS

| 5,455,693 A | 10/1995 | Wreede et al. |
|---|---|---|
| 6,072,606 A | 6/2000 | Huether et al. |
| 6,366,371 B1 | 4/2002 | Kodama et al. |
| 6,407,833 B2 | 6/2002 | Klug et al. |
| 6,614,565 B1 | 9/2003 | Klug et al. |
| 7,253,799 B2 * | 8/2007 | Lee ...................... G02B 6/0036 345/102 |
| 2001/0013961 A1 * | 8/2001 | Klug ........................ G03H 1/00 359/32 |
| 2011/0267666 A1 | 11/2011 | Redmond |

FOREIGN PATENT DOCUMENTS

GB 2178866 A 7/1989

OTHER PUBLICATIONS

Feb. 13, 2014 Restriction Requirement issued in U.S. Appl. No. 13/142,308, by Jyotsna V. Dabbi.
(Continued)

*Primary Examiner* — Stephone B Allen
*Assistant Examiner* — Jyotsna Dabbi
(74) *Attorney, Agent, or Firm* — Wright IP & International Law; Eric G. Wright

(57) ABSTRACT

An apparatus and method for displaying holograms. A compact and self-contained lighting system for a display hologram, which can produce high quality images and which is substantially insensitive to stray light.

12 Claims, 9 Drawing Sheets

(52) U.S. Cl.
CPC ... *G03H 1/2286* (2013.01); *G03H 2001/0473* (2013.01); *G03H 2001/2223* (2013.01); *G03H 2001/2231* (2013.01); *G03H 2001/2234* (2013.01); *G03H 2001/261* (2013.01); *G03H 2001/264* (2013.01); *G03H 2222/18* (2013.01); *G03H 2222/34* (2013.01); *G03H 2223/24* (2013.01); *G03H 2227/06* (2013.01); *G03H 2250/33* (2013.01); *G03H 2250/42* (2013.01)

(58) Field of Classification Search
CPC ............... G03H 2001/2223–2001/2236; G03H 2222/00; G03H 2222/18; G03H 2222/34; G03H 2223/00; G03H 2223/50–2223/54; G03H 1/26; G03H 1/00; G03H 1/02; G03H 1/2286; G03H 2001/2263; G03H 2001/2271; G02B 5/32; G02B 5/20; G02B 5/203; G02B 27/0103
USPC .......................... 359/1, 14, 15, 22–24, 30–33
See application file for complete search history.

(56) References Cited

OTHER PUBLICATIONS

May 22, 2014 Office Action issued in U.S. Appl. No. 13/142,308 by Jyotsna V. Dabbi.

\* cited by examiner

PRIOR ART

PRIOR ART

APPARATUS AND METHOD FOR DISPLAYING TRANSMISSION AND REFLECTION HOLOGRAMS

CROSS-REFERENCE TO RELATED APPLICATIONS

This is a divisional application under the provisions of 35 U.S.C. §120 of U.S. patent application Ser. No. 13/142,308 filed Jun. 27, 2011, which in turn is a U.S. national phase application under the provisions of 35 U.S.C. §371 of International Patent Application No. PCT/GB09/51779 filed Dec. 31, 2009, which in turn claims priority of United Kingdom Patent Application No. 0823686.1 filed Dec. 31, 2008. The disclosures of such U.S. and international patent applications and United Kingdom priority patent application are hereby incorporated herein by reference in their respective entireties, for all purposes.

FIELD OF THE INVENTION

The present invention relates to apparatus and methods for displaying holograms. More particularly, the present invention relates to apparatus and methods for displaying transmission and reflection holograms.

BACKGROUND OF THE INVENTION

There exists a need in the art to provide a compact and self-contained lighting for a display hologram, which can produce high quality images and which is insensitive to stray light, particularly other near-point source lights (such as halogen spot lamps) or any other lighting sources used for ambient illumination near the direction of the main light source used to illuminate the hologram.

Although there have been previous ways of creating holograms all of these have particular difficulties. For example, U.S. Pat. No. 6,366,371 B1 which relates to use of a reflection hologram in transmission geometry has poor efficiency and stray light control. Furthermore, although GB 2 178 866 describes ways to fold light around to form a hologram there is no disclosure of transmission geometry and also has poor efficiency and stray light control. U.S. Pat. No. 6,366,371 B1 and GB 2 178 866 are incorporated herein by reference.

With the goal of making display holography a widely acceptable imaging media, e.g. for advertising or artistic displays, there are problems with conventional techniques which prevent widespread acceptance. Three of these problems specifically are:

(1) That typically the hologram and required illuminating light source are separate parts, requiring the light source to be installed separately from the hologram which is an extra complexity and is a barrier for users;

(2) The type of hologram which is most effective for displays (a reflection hologram) must be lit from the front, and is inherently sensitive to other ambient lighting, which in general causes unwanted ghost images; and (3) Conventional broadband illumination from e.g. a tungsten lamp is inefficient and results in undesirably high image haze and consequently low image contrast. It is an object of at least one aspect of the present invention to obviate or mitigate at least one or more of the aforementioned problems.

It is a further object of at least one aspect of the present invention to provide apparatus and a method for providing compact and self-contained lighting for a display hologram, which can produce high quality images and which is substantially insensitive to stray light, particularly other near-point source lights (such as halogen spot lamps) used for ambient illumination near the direction of the main light source used to illuminate the hologram.

It is a yet further object of at least one aspect of the present invention to provide holographic displays as a general graphic medium, suitable for advertising, technical and medical visualisation, and consumer applications (e.g. posters, 3D photographs).

SUMMARY OF THE INVENTION

According to a first aspect of the present invention there is provided a holographic display apparatus comprising:

a light source capable of emitting light to illuminate a hologram and form a consequent holographic image;

at least one mirror capable of reflecting light from the light source;

a hologram surface;

wherein reflected light from the mirror is capable of forming a holographic image from the hologram surface.

The present invention relates to display holograms which have a widely acceptable imaging media that may be suitable for advertising or artistic displays. Alternatively, the formed holograms may be used for any other commercial purpose for which a fee may be received. The holograms of the present invention may be transmission or reflection holograms.

Generally speaking, the present invention resides in the provision of display holograms (i.e. holographs) which may be substantially self-contained, provide viable illumination and are substantially insensitive to stray light.

The apparatus may comprise a single light source or a plurality of light sources. There may be two or more light sources emitting with different or substantially different spectra capable of creating a specific set or range of perceived colours. For example, there may be light sources which may emit light in the red, green and blue regions of the electromagnetic spectrum which may be used to create a wide range of colours substantially covering the range of naturally perceived colours. In particular embodiments there may be three light sources which may independently emit light in the red, green and blue parts of the electromagnetic spectrum. Electrical powers in the range of about 10-500 W in total may be typical, depending on the source type and hologram size.

The light sources may be any appropriate or suitable light source and may, for example, be a lamp, a laser or LED, or any combination thereof, including multiples of each, such as red, green and blue lasers or LEDs, or more than 3 colours.

Typically, the light source or sources in the present invention may be located and/or positioned behind or substantially behind the hologram being formed. This is in contrast to the prior art where the light source is located in front of the formed hologram. The present invention therefore relates to a reflection or transmission hologram with the light source or sources located and/or positioned behind or substantially behind the hologram being formed.

The light source or sources may be located and/or positioned within an enclosure or box. The light source or sources may therefore be substantially encapsulated within the holographic display apparatus thereby forming a self-contained apparatus. This is in contrast to prior art systems.

In alternative embodiments, the light source or sources may be positioned outside the enclosure using, for example, a close proximity mirror.

Typically, the formed hologram may be formed on an inner surface/side of the enclosure or box and may then be viewed from the outside. The display surface may therefore be substantially transparent.

The holographic display apparatus may also comprise optics which may be used to redirect or refocus the emitted light into a desired way for the formed hologram.

The holographic display apparatus may also comprise light blocks which may be formed from light absorbing material such as black felt. This may help to minimise any unwanted light interference and/or specular reflection which has the effect of degrading the desired image quality.

Typically, the at least one mirror capable of reflecting light from the light source may be specifically oriented and positioned to form the hologram. The mirror may maximise the distance between the light source and the formed hologram. The total distance from the source to the centre of the hologram may be typically of the order of the largest dimension of the hologram, or a small multiple thereof (e.g. about a 0.5.times.0.5 m hologram will typically have a source about 0.5-2 m from its centre). Optically, the source may be imaged so as to appear to be much further away, and ultimately if the source is imaged at infinity it makes the hologram simpler to produce, as the reference beam angle is constant across the surface.

Illumination angles from the mirror are high and are typically, for example, about 50-85 degrees or preferably 60-85 degrees and typically at least about 70 degrees.

In particular embodiments light emitted from the light source or sources may undergo more than one reflection before illuminating the hologram surface.

Using a hologram illumination system according to the present invention has the advantage that this prevents ghost images as there is only desired and wanted light sources (i.e. no unwanted external light source such as sunlight and other lights) which are capable of creating an image of significant brightness, and may therefore be inherently insensitive to external stray light. In preferred embodiments, a reflection hologram illuminated via a mirror at the bottom edge of the hologram is a preferred geometry as this may be substantially insensitive to stray light since no light is likely to come from the floor or substantially the lower area. The mirror may therefore be located in a lower region (e.g. the lower half) of the enclosure or box.

In particular embodiments, the holographic display apparatus comprises three light sources which independently produce red, green and blue light, respectively. Light emitted from the three light sources may then be transmitted through focusing optics. The light from the light sources may combine into a single beam or may be spatially separate. In the event that different coloured light is kept separate, the formed red/green/blue (RGB) holograms may each be designed for the source locations, and consequently produce a registered full-colour image with full RGB overlap. Light from different light sources may therefore have different wavelengths.

The mirror in the holographic display apparatus according to the present invention may be non-planar and, for example, curved (e.g. concave shaped) which may collimate and/or reduce the curvature of the illumination wavefront at the hologram. The advantage of this is illumination efficiency, since the light may be directed to efficiently illuminate a rectangular hologram surface with minimised overspill on the edges. Alternatively, the mirror may be a holographic optical element (HOE) or a diffractive optical component such as a diffractive optical element (DOE). The purpose of the HOE or DOE is to substantially collimate the source light in a more compact flat optic or alternatively may be designed to simultaneously redirect RGB light into a common direction.

In particular embodiments there may be a first mirror and a second mirror. A second mirror enables more convenient physical arrangement of the optical path within the box, and/or enables a greater optical distance from the source(s) to the hologram surface, which is typically beneficial. At least one of the first and second mirrors may be a holographic optical element (HOE) or diffractive optical element (DOE).

In particular embodiments, the holographic display apparatus comprises preferred stray-light insensitive orientation by locating and/or positioning the light source or light sources and optics or mirrors so that the hologram illuminating light ultimately comes from either inside the box in the case of a transmission hologram, or from outside the box and below in the case of a reflection hologram, which further helps to prevent stray-light from degrading the quality of the formed holographic image. This is because most stray sources are from outside and above (i.e. not at floor level). The illumination must come from outside, and to minimise stray light, illumination may come from below, causing any subsequent ghost images to be invisible, very weak, or displaced sufficiently from the main desired image as to not be objectionable.

In particularly preferred embodiments, the holographic display apparatus comprises a spectral reflector (e.g. a mirror). The spectral reflector may function as a mirror and may, for example, be mounted substantially in front of the formed reflection holographic image. The spectral reflector may have the purpose of redirecting light which has initially been transmitted through the hologram and back to illuminate the hologram at, for example, the respective Bragg angle. To achieve this, the properties of the spectral reflector (e.g. a second mirror in a holographic display apparatus) are such that the spectral reflector may strongly reflect incoming illumination light at a high angle (e.g. about at least 70.degree. and over) but may be substantially transparent to diffracted light in the image from the hologram, typically at, for example, about <45.degree. to the normal. The spectral reflector may therefore reflect light at high angles but allow light at lower angles to transmit therethrough. The spectral reflector may be formed from a multi-layer thin-film coating on a substrate near to or bonded to the image hologram, or alternatively coated directly onto the hologram. The spectral reflector may, for example, be an HOE.

In embodiments, where, for example, a laser may be used to illuminate a hologram where the spectral reflector may have the function of redirecting light which has initially been transmitted through the hologram and back into the apparatus where it can be absorbed. This may prevent unwanted light from escaping from the apparatus which may be distracting or dangerous to a viewer, particularly if the light sources are lasers and hence eye safety is a requirement.

In these embodiments the Illuminating light may first pass through the hologram and reach, for example, a flat optic substantially parallel to the hologram which may reflect the light back towards the hologram at its intended illumination angle. The holographic image may therefore be recreated and may be transmitted through, for example, the flat optic to a viewer outside the enclosure. This arrangement is preferable because a reflection-type image hologram may produce the highest possible image quality typically because it produces less image blur for a non-monochromatic light source. However, it requires illumination to come from the viewer side (or substantially the viewer side) of the hologram, either from an external lamp, or at least via an external reflecting component.

In the case of a transmission image hologram, or a reflection hologram using a second mirror in the form of a spectral reflector, a partially absorbing sheet (grey glass, plastic or film) may be mounted either immediately in front of or substantially behind the image hologram to further increase contrast. This may help to facilitate discrimination of image light relative to any light which may illuminate the inside of the enclosure (such as external sunlight or room light which passes through the hologram and illuminate the inside of the enclosure). This works because the light creating the image is attenuated only once by passing though the absorbing layer (either before or after diffraction), but the external light must pass through it twice to contribute to image stray light, thus improving the contrast of the image relative to the unwanted stray light.

The illumination systems as herein described therefore have the following advantages:

Self contained

Insensitive to stray light

Narrowband RGB light sources such as LEDs or lasers provide efficient illumination by closely matching the reflected spectrum of the holograms.

According to a second aspect of the present invention there is provided a method of producing a holographic image comprising:

providing a light source capable of emitting light to form a holographic image;

providing at least one mirror capable of reflecting light from the light source;

providing a hologram surface;

wherein the reflected light from the mirror is capable of forming a holographic image from the hologram surface.

According to a third aspect of the present invention there is provided a holographic display apparatus comprising:

a light source capable of emitting light to illuminate a hologram and form a consequent holographic image;

a hologram surface;

a first mirror capable of reflecting light from the light source;

a second mirror capable of both reflecting and transmitting light from the first light source, wherein the reflected light from the second mirror is capable of illuminating the hologram surface; and wherein the illuminated hologram surface is capable of forming a holographic image.

Typically, the first and/or second mirror may be a spectral reflector.

The second mirror may be mounted substantially in front of the reflection hologram.

The second mirror may therefore reflect incoming illumination light at a high angle (e.g. about at least 70° and over) and be substantially transparent to diffracted light in the image from the hologram at about <45° to the normal.

According to a fourth aspect of the present invention there is provided a method of producing a holographic image comprising:

providing a light source capable of emitting light to illuminate a hologram and form a consequent holographic image;

providing a hologram surface; providing a first mirror capable of reflecting light from the light source;

providing a second mirror capable of both reflecting and transmitting light from the first light source, wherein the reflected light from the second mirror is capable of illuminating the hologram surface; and wherein the illuminated hologram surface is capable of forming a holographic image.

According to a fifth aspect of the present invention there is provided use of a holographic display apparatus according to the first and third aspect in advertising, artistic displays, technical and medical visualisation, and consumer application (e.g. posters, 3D photographs).

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of display holograms which are substantially self-contained, provide viable illumination and are substantially insensitive to stray light.

Figure 1:
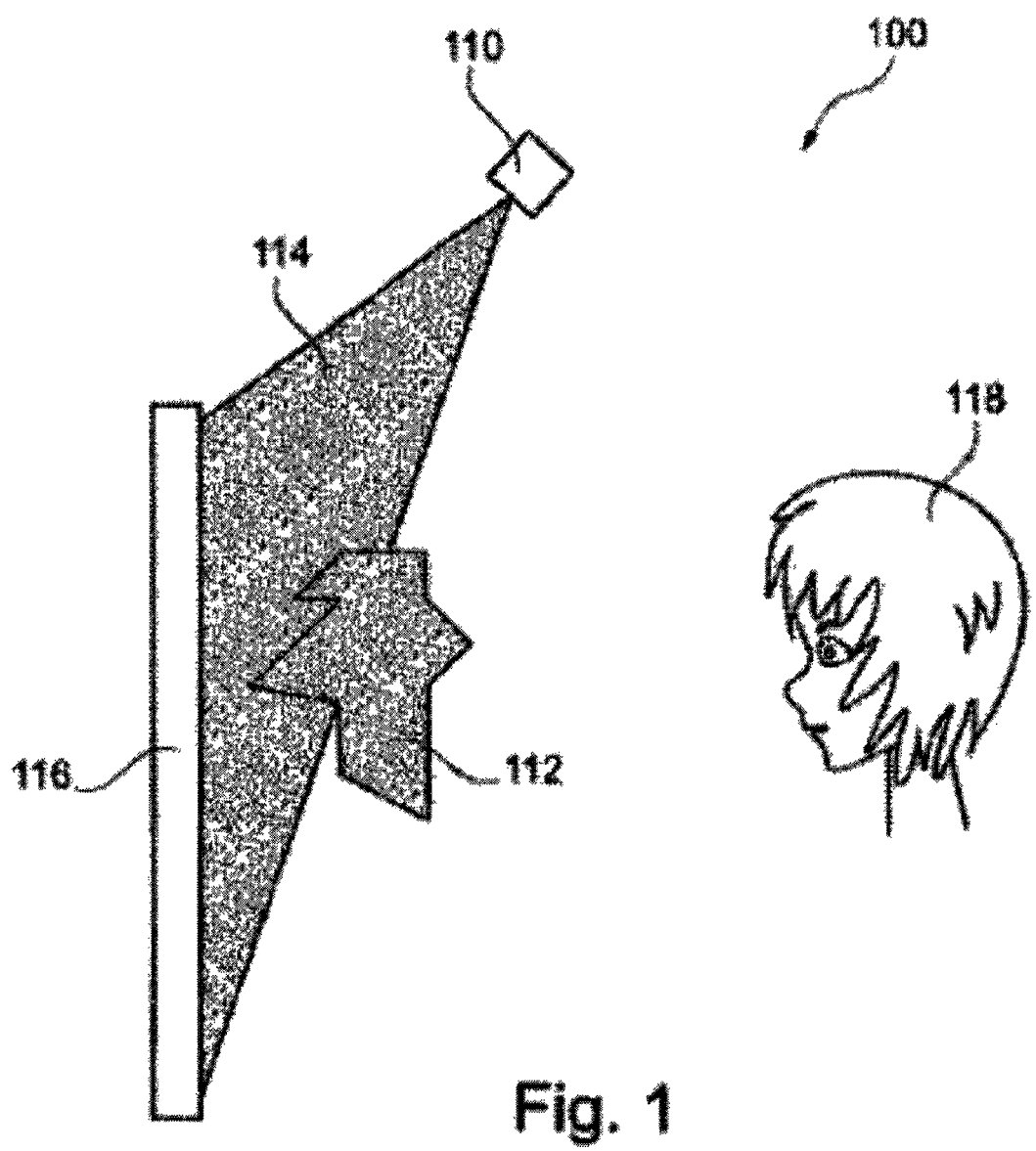
FIG. 1 is a representation of a conventional prior art holographic illumination geometry.

FIG. 1 represents a prior art holographic illumination system, generally designated 100. As shown in FIG. 1 a light source (e.g. a lamp) 110 is mounted in front of and above a hologram 116. Light 114 is emitted from the light source 110 onto a hologram 116 which then creates the holographic image 112. The holographic image 112 may then be viewed by an observer 118.

However, the prior art arrangement illumination 100 shown in FIG. 1 has a number of disadvantages. For example, the light source 110 (e.g. the lamp) is a separate part which therefore requires separate installation. Alternatively, if the light source 110 is combined mechanically with the hologram 116, in order to be unobtrusive then it is positioned typically close to the hologram 112 which causes other problems, mainly that the illumination from the light source 110 will be non-uniform on the hologram 116 (causing image brightness variations in the image 112), and such close proximity must be emulated during the recording process, requiring the recording reference beam to have large angular range across the surface of the hologram 116. This can be difficult to achieve; a classical hologram would require to be recorded with the reverse, or "conjugate", highly converging beam and thus require a very large curved mirror, or alternatively a holographic stereogram recorded pixel-by-pixel would require very large angle scan lenses which are difficult to design and expensive. If the recording light point location does not emulate that of the final illumination, image distortion and brightness and colour variations all are the result. In general a more distant illumination point is therefore desirable.

Figure 2:
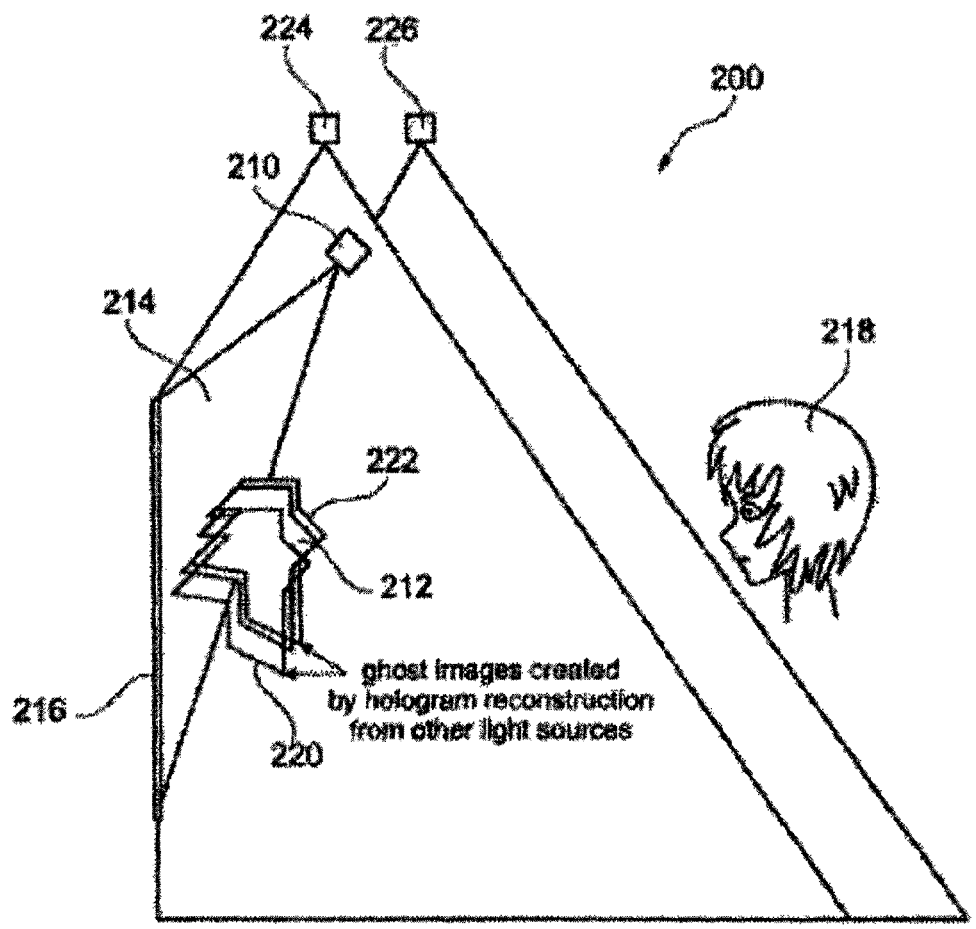
FIG. 2 is a representation of a further conventional prior art holographic illumination geometry with more than one light source which produces ghost images.

A further problem with prior art illumination systems is shown in FIG. 2. FIG. 2 represents a holographic illumination system 200 with a light source 210 and a hologram 216 which may be viewed by an observer 218. The light source 210 creates light 214 which forms a holographic image 212. As shown in FIG. 2 there are ghost images 220, 222 caused by other light sources 224, 226 which may, for example, be other ceiling or sky light sources.

Figure 3:
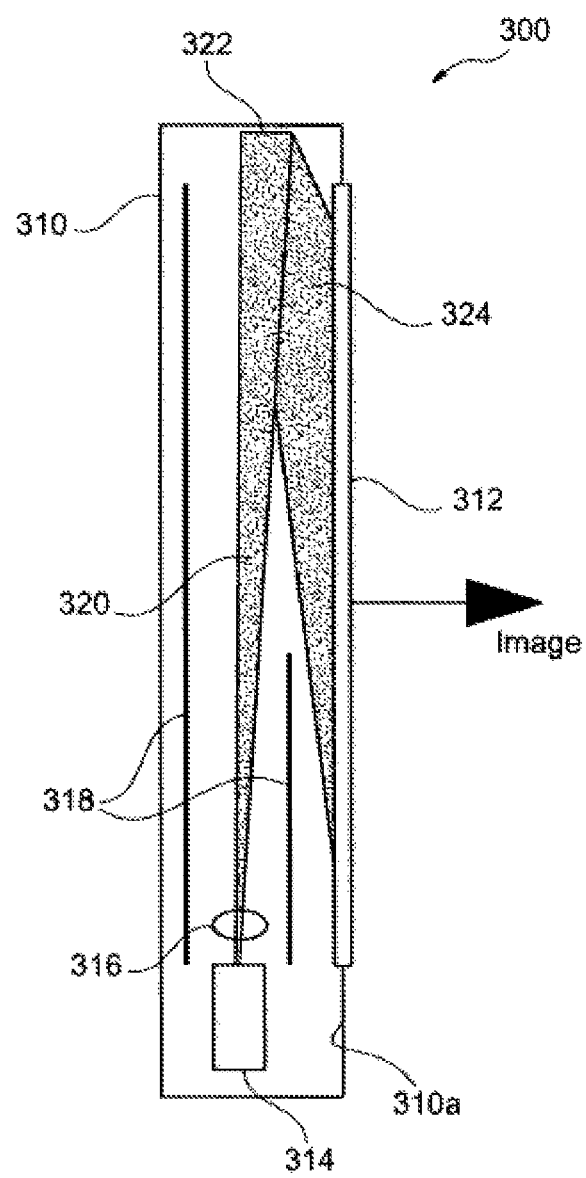
FIG. 3 is a representation of a holographic illumination system according to an embodiment of the present invention.

FIG. 3 represents a holographic illumination system according to the present invention generally designated 300. As shown in FIG. 3 the holographic illumination system 300 comprises an enclosure 310 which boxes in and encapsulates the illumination system 300. The holographic illumination system 300 is therefore self-contained. As shown above in FIGS. 1 and 2 this is quite different to prior art systems. A transmission hologram 312 is illuminated on a face 310a of the enclosure 310.

FIG. 3 also shows that a light source 314 is located within the enclosure 310. The light source 314 may, for example, be a laser or LED light source or multiples thereof. Light emitting from the light source 314 then passes through some optics 316 which may be used to focus the emitted light in a desired way. To minimise any unwanted light interference and specular reflection, light blocks 318 are used. The light blocks 318 are used of any light absorbing material such as black felt. Emitted light 320 is then transmitted onto a mirror 322 to form reflected light 324. The reflected light is then transmitted onto the inner surface 310a of the enclosure thereby illuminating the transmission hologram 312 which forms an image which may be seen by an observer.

The emitted light 320 therefore undergoes a mirror reflection to maximize the distance between the light source 314 and the transmission hologram 312. Typical distances for this arrangement are approximately 1.5 times the hologram height, such as about 0.75 m for a hologram which is about 0.5 m high.

As shown in FIG. 3, the illumination angles are high such as about 60-85 degrees and typically at least about 70 degrees. Although not shown, the emitted light 320 may undergo more than one reflection. High angles are preferred because they enable the enclosure to have smaller depth, making a more compact system, which is preferable for most applications. For example, it is desirable to achieve an aspect ratio (ratio of the greater of the width or height to the depth) of 10 or greater. In an alternative to using the light source 314 within the enclosure 310, the light source may be positioned outside the enclosure 310.

Using a hologram illumination system 300 as shown in FIG. 3 has the advantages that this prevents ghost images as unwanted external illumination does not result in any substantial light (including ghost images) being diffracted in the forward direction towards a viewer, and is therefore inherently insensitive to external stray light.

Figure 4:
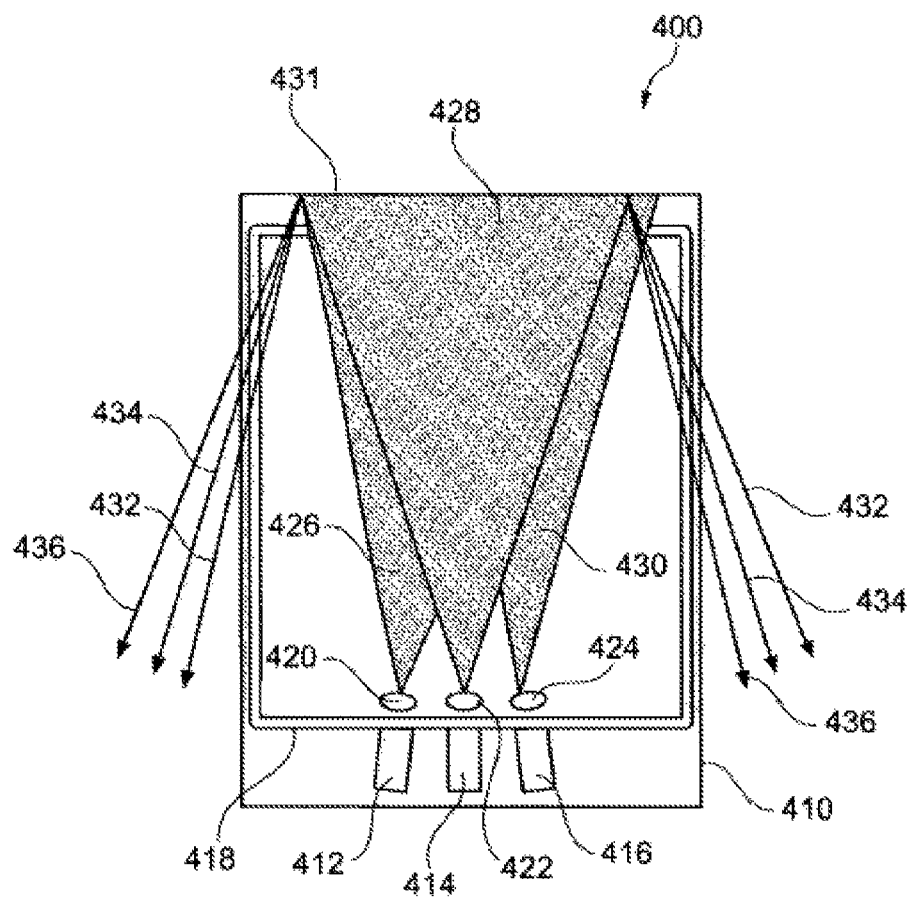
FIG. 4 is a representation of a holographic illumination system according to a further embodiment of the present invention which uses three light sources.

FIG. 4 is a representation of a further hologram illumination system 400 as seen from the viewer's position. The hologram illumination system 400 uses three light sources 412, 414, 416. The light sources 412, 414, 416 are located within an outer enclosure 410. However, the emitted light is then transmitted to show a front view 418 of the hologram. Light emitted from the three light sources 412, 414, 416 is transmitted through focusing optics 420, 422, 424, respectively. The light sources 412, 414, 416 emit red light 426, green light 428 and blue light 430, respectively. The light from the light sources 412, 414, 416 may combine into a single beam or may be spatially separate. In the event that the different coloured light is kept separate, the formed red/green/blue (RGB) holograms may each be designed for the source locations, and consequently produce a registered full-colour image with full RGB overlap.

As shown in FIG. 4, the light from the light sources 412, 414, 416 is reflected off a mirror 431. The reflected red light 432, green light 434 and blue light 436 may then be used to produce a hologram.

Figure 5:
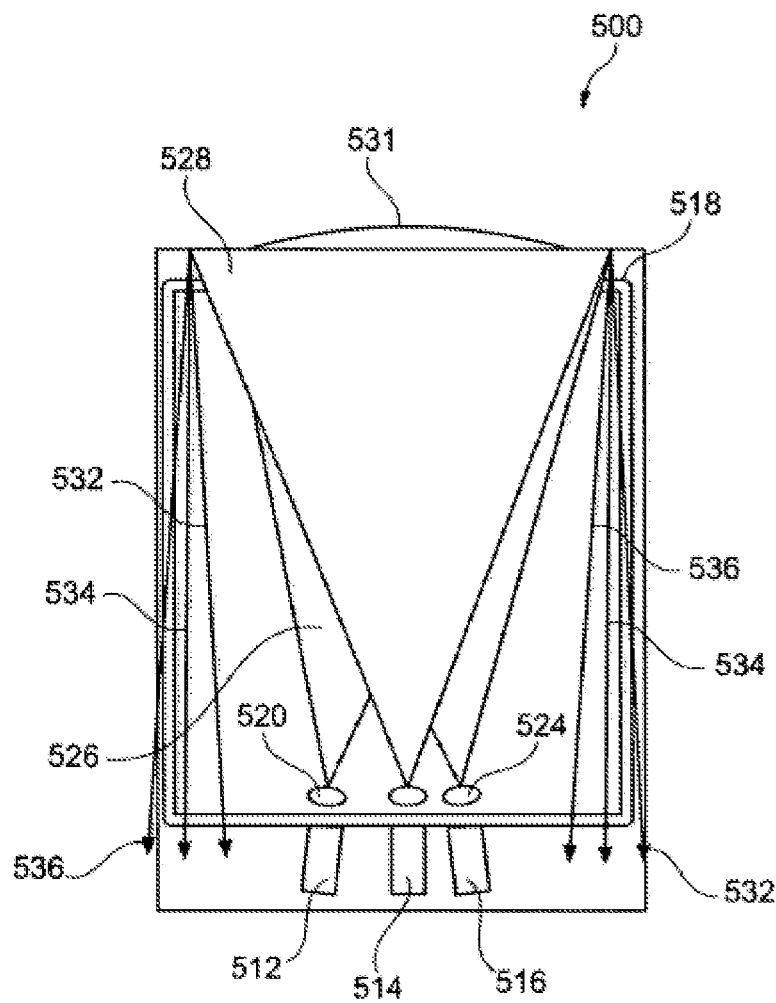
FIG. 5 is a representation of a holographic illumination system according to a further embodiment of the present invention which uses three light sources and a curved mirror.

FIG. 5 is a representation of a further holographic illumination system 500. The holographic illumination system 500 comprises three light sources 512, 514, 516 which independently produce red light 526, green light 528 and blue light 530, respectively, which is focused through focusing optics 520, 522, 524, respectively. The light sources 512, 514, 516 are located within an enclosure 510. There is also shown reflected red light 532, green light 534 and blue light 536 which may then be used to produce a transmission hologram. The difference in the holographic illumination system 500 is that there is a curved mirror 531 which collimates and/or reduces the curvature of the illumination wavefront at the hologram. The advantage of this is illumination efficiency, since the light can be directed to a rectangular hologram surface with less wasted overspill of light.

Figure 6:
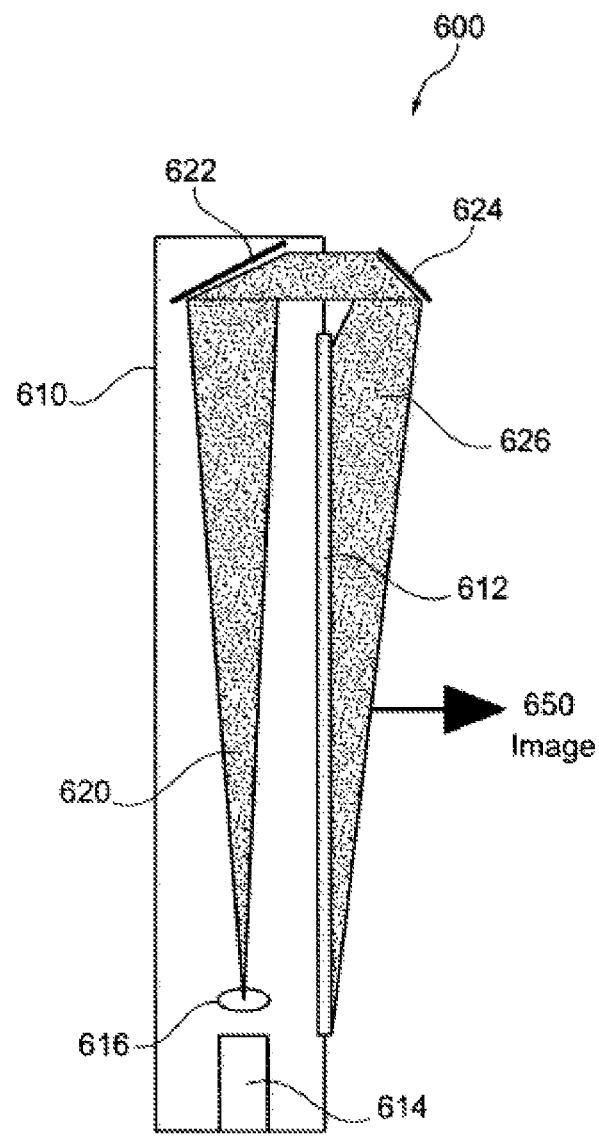
FIG. 6 is a representation of a holographic illumination system according to a further embodiment of the present invention which uses two mirrors in forming a hologram.

FIG. 6 is a representation of a further holographic illumination system 600. The holographic illumination system 600 comprises an enclosure 610 with a reflection hologram 612. There is also a light source 614 which emits light through optics 616. Emitted light 620 is then reflected off a first mirror 622 and then a second mirror 624. At least one of the first and second mirrors 622, 624 may be a curved mirror or a holographic optical element (HOE) or diffractive optical element (DOE), whose purpose is to collimate the source light in a more compact flat optic and/or may be designed to simultaneously redirect RGB light into a common direction. Reflected light 626 from the second mirror 624 is then used to form the holographic image 650.

Figure 7:
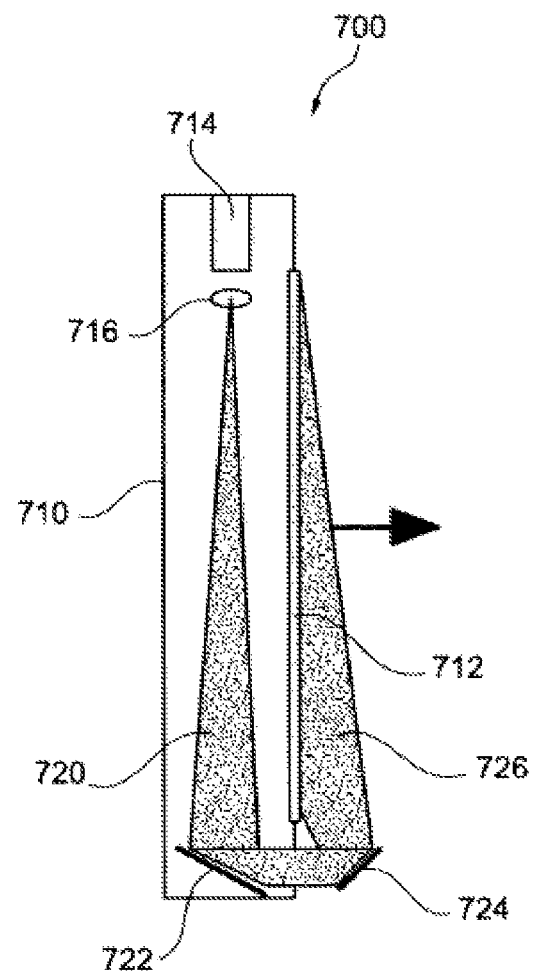
FIG. 7 is a representation of a holographic illumination system according to a further embodiment of the present invention which uses two mirrors in forming a hologram and also where the illumination is incident on the hologram from outside and below the hologram.

FIG. 7 is a representation of a further holographic illumination system 700. The holographic illumination system 700 comprises an enclosure 710 with a reflection hologram 712. There is also a light source 714 which emits light through optics 716. Emitted light 720 is then reflected off a first mirror 722 and then a second mirror 724. At least one of the first and second mirrors 722, 724 may be an HOE or DOE, whose purpose is to collimate the source light in a more compact flat optic or alternatively may be designed to simultaneously redirect RGB light into a common direction. Reflected light 726 from the second mirror 724 is then used to form the holographic image 712. It is important to note that the holographic illumination system 700 in FIG. 7 has a stray-light insensitive orientation since most external stray sources are above the hologram and viewer. In FIG. 7, the hologram illuminating light is incident from below or substantially, while typical stray light sources are incident from above or substantially above, and are thus angularly well separated from the main illumination light, resulting in poor "Bragg-matching" of the stray light, and hence very weak reconstruction of any ghost images, resulting in a substantially stray-light insensitive system.

Figure 8:
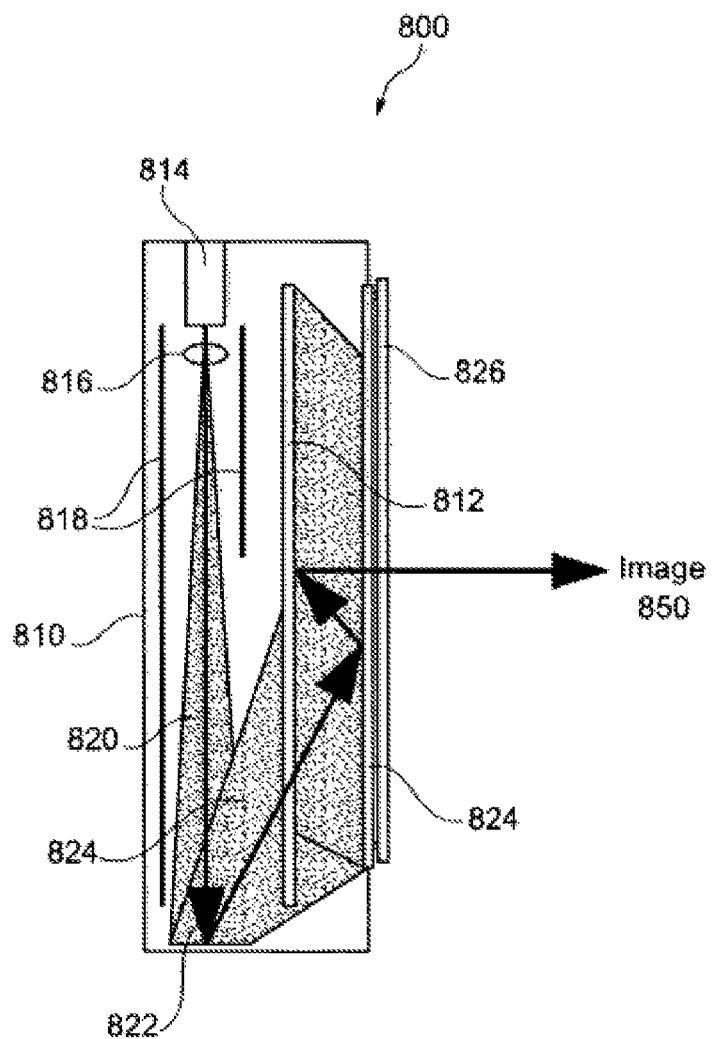
FIG. 8 is a representation of a holographic illumination system according to a further embodiment of the present invention which uses a spectral filter.

FIG. 8 is a representation of a further holographic illumination system 800. The holographic illumination system 800 comprises an enclosure 810 with a reflection hologram 812. There is a light source 814 which emits light through optics 816. There are light blocks 818 which are used to minimise unwanted scattering or reflections of light which may degrade the image quality. The emitted light 820 then strikes a first mirror 822 (or a HOE/DOE). The reflected light then strikes a second mirror 824 (or HOE/DOE) where it reflects again and illuminates the hologram 812, creating the holographic image 850. Optionally, there is some glass or optical plastic 826 in front of the reflection hologram 812.

The holographic illumination system 800 shown in FIG. 8 is different in that the second mirror 824 which functions as a spectral reflector is mounted substantially in front of the reflection hologram 812. The second mirror 824 has specific spectral reflection and transmission properties and may have the purpose of redirecting light which has been transmitted through the hologram 812 back to illuminate the hologram 812 at its Bragg angle and thus recreate the holographic image. To achieve this, the properties of the second mirror 824 are such that it strongly reflects the incoming illumination light at a high angle (e.g. about at least 70.degree. and over) but is transparent to diffracted light in the image from the hologram, typically at about <45.degree. to the normal, at least in the vertical direction. The second mirror 824 can be formed from a multi-layer thin-film coating on a substrate near to or bonded to the image hologram 812, or coated directly onto the hologram 812. Alternatively, the second mirror 824 may be an HOE. Most simply, the HOE is "conformal" i.e. fringe planes parallel to the surface and acting like a mirror, containing three optically exposed hologram gratings designed to reflect incoming RGB light bands.

In the holographic illumination system 800 shown in FIG. 8 Illuminating light first passes through the hologram 812 and reaches a flat optic 824 substantially parallel to the hologram 812 which reflects the light back towards the hologram 812 at its intended illumination angle. The holographic image 850 is recreated and is transmitted through the flat optic 824 to the viewer outside the enclosure or box.

Such an embodiment is preferable because a reflection-type image hologram 812 is typically preferable because it produces the highest possible image quality because it produces less image blur for a non-monochromatic light source. However, it requires illumination to come from the viewer side of the hologram, either from an external lamp, or at least via an external reflecting component such as the arrangements shown in FIGS. 3 to 8. The current embodiment therefore provides stray light insensitivity using the preferred reflection-type hologram in the most desirable self-contained structure.

Important design features of holographic illumination system 800 shown in FIG. 8 are as follows:

(a) The angles are chosen so that the image hologram 812 has zero diffraction efficiency for the illuminating spectrum in the first pass. This requires that none of the final diffracted image light directions may overlap with the first pass light directions. Therefore, high incident angles are preferable, and also collimated (or nearly so) light is preferable, as may be produced by a curved mirror or HOE described above;

(b) The flat optic (i.e. second mirror 824) has spectral properties that (1) cause it to reflect the RGB light at the high initial incident angles, and (2) cause minimum reflection of the light diffracted into the image (i.e. at incident angles corresponding to the viewing angle range of the hologram). This can be achieved, for example, by multi-layer thin-film coatings on a glass or transparent plastic substrate, with spectral properties designed appropriately. Alternatively, it may be a holographic optical element (HOE), created with RGB reflection bands appropriately. (If an HOE, then more functionality is possible, such as focusing/collimating power, or separate RGB redirection);

(c) The geometry shown in FIG. 8 is substantially insensitive to stray light as the hologram illumination is from below and no stray light sources come from below, whereas typical stray light sources from above are poorly Bragg-matched to the hologram, causing any ghost images created to be very weak or not present;

(d) The optic component (i.e. second mirror 824) may be directly bonded to the image hologram 812 forming a single piece (e.g. a hologram on flexible film may be bonded to another piece of film containing the HOE or alternatively one part may be film and the other on a rigid substrate to guarantee a distortion-free image.

In the case of a transmission image hologram, a partially absorbing sheet (grey glass, plastic or film) 826 may be mounted either immediately in front of or behind the image hologram to further increase contrast. In the case of a reflection hologram with associated spectral mirror, a partially absorbing sheet may be mounted either immediately behind the hologram or in front of the spectral filter to further increase contrast. This may help to facilitate discrimination of image light relative to any light which may illuminate the inside of the enclosure or box (such as external sunlight or room light which passes through the hologram and illuminate the inside of the enclosure 810). This works because the light creating the image is attenuated once by passing though the absorbing layer (either before or after diffraction), but the external light must pass through it twice to contribute to image stray light, thus improving the contrast between the image and stray light which may reach the inside of the enclosure.

Figure 9:
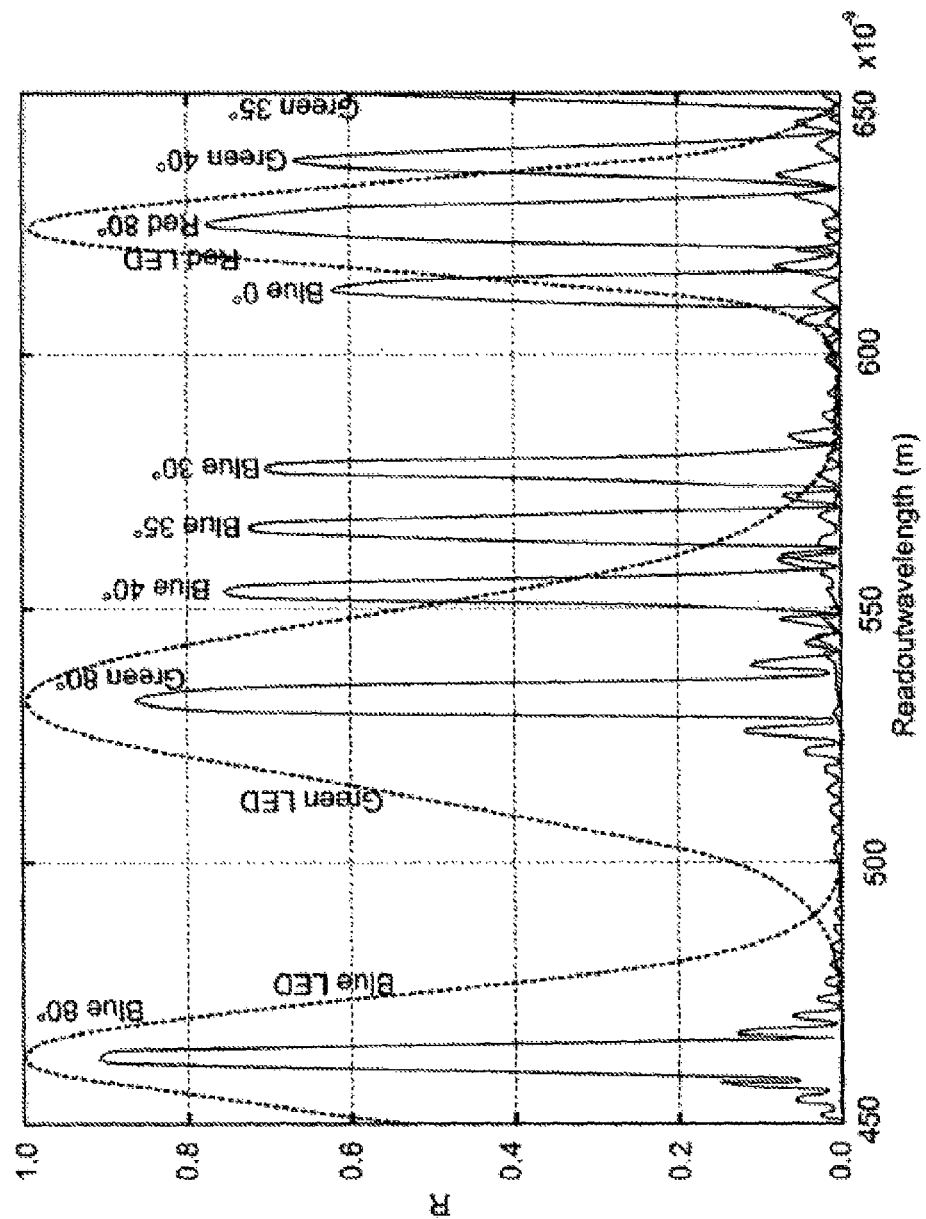
FIG. 9 is a representation of a holographic simulation according to a further embodiment of the present invention.

FIG. 9 shows simulations to verify the concept of using a spectral filter as shown in FIG. 8. Three conformal HOEs in a single typical 30 .mu.m photopolymer film with the appropriate periods are used in the simulation. The simulation is designed to strongly reflect the light emitting LEDs at 80 degrees. The simulation is used to analyse whether such gratings are detrimental to diffracted image energy. The simulation used a 0-30. degree. range of angles in the image light (i.e. typical for an image hologram) which provided the following results:

The Blue grating reflects at 610-580 nm i.e. approximately between the red and green LEDs, taking very little power.

The Green grating is reflecting >650 nm, so there is no problem.

The Red grating is reflecting >>650 nm, so there is no problem.

The illumination systems as herein described therefore have the following advantages:

Self contained

Insensitive to stray light

Narrowband RGB light sources such as LEDs or lasers provide efficient illumination by closely matching the reflected spectrum of the holograms.

The absence of illumination light in the unused regions of the spectrum between the diffracting bands of the holograms results in less background image haze (optical scatter) in the image, compared to conventional broadband (e.g. tungsten) lamps.

Use of spatially separate RGB sources is a security feature; a stolen hologram will not work unless it is illuminated by separate RGB sources at the right positions.

Long throw aids safety, since it avoids having a high intensity source potentially close to the viewer's eye. For lasers this could be very important.

The spectral filter version in FIG. 8 is ideal for lasers.

Whilst specific embodiments of the present invention have been described above, it will be appreciated that departures from the described embodiments may still fall within the scope of the present invention. For example, any suitable type of light source or plurality of light sources may be sued to form the hologram. Moreover, any suitable type of reflecting surfaces (e.g. mirrors) may be used.

I claim:

1. A hologram display apparatus, comprising:
   a light source or a plurality of light sources capable of emitting light to illuminate a reflection hologram and form a consequent color holographic image;
   the reflection hologram constructed to form the color holographic image;
   at least a first mirror capable of reflecting light from the light source or the plurality of light sources;
   a hologram surface which forms the color holographic image;
   a spectral reflector;
   wherein said first mirror is configured substantially perpendicular to said spectral reflector;
   wherein light from the light source or the plurality of light sources reflects from said first mirror and first passes through the reflection hologram onto the spectral reflector which is configured substantially parallel to the reflection hologram which reflects light back towards the reflection hologram at its intended illumination angle and wherein the color holographic image is recreated and transmitted through the spectral reflector to a viewer.

2. The hologram display apparatus of claim 1, wherein the holographic display apparatus further comprises optics which are used to redirect and/or refocus emitted light into a desired way for the reflection hologram, light blocks which are capable of minimizing any unwanted light interference and/or specular reflection.

3. The hologram display apparatus of claim 1, wherein a distance between the light source and the reflection hologram is about 0.5 m-2 m, there is an illumination angle from the first mirror of about 50 degrees-85 degrees, and wherein the mirror is non-planar and curved, which is used to collimate and/or reduce a curvature of an illumination wavefront at the reflection hologram.

4. The hologram display apparatus of claim 1, wherein a distance between the light source and the reflection hologram is about 0.5 m-2 m, there is an illumination angle from the first mirror of about 60 degrees-85 degrees, and wherein a mirror is non-planar and curved, which is used to collimate and/or reduce the curvature of the an illumination wavefront at reflection hologram.

5. The hologram display apparatus of claim 1, wherein the distance between the light source and the reflection hologram is about 0.5 m-2 m, there is an illumination angle from the first mirror of at least about 70 degrees, and wherein the mirror is non-planar and curved, which is used to collimate and/or reduce the curvature of the illumination wavefront at the reflection hologram.

6. The hologram display apparatus of claim 1, wherein either or both the first mirror and the spectral reflector are a holographic optical element or diffractive optical element.

7. The hologram display apparatus of claim 6, wherein the light incident on the reflection hologram comes substantially from below which further helps to prevent stray-light from degrading a quality of the formed the color holographic image, wherein the spectral reflector is mounted substantially in front of the reflection hologram.

8. A hologram display apparatus according to claim 7, wherein the spectral reflector has a function of redirecting light which has initially been transmitted through the reflection hologram and back to illuminate the reflection hologram and therefore create the color holographic image, and wherein a laser is used to illuminate a hologram and where the spectral reflector is capable of redirecting light which has initially been transmitted through the reflection hologram and back into the apparatus where it can be absorbed.

9. The hologram display apparatus of claim 6, wherein unwanted light is capable of being prevented from escaping from the apparatus which is distracting or dangerous to a viewer, and wherein a spectral reflector reflects incoming illumination light at an angle of about at least 70° and over and is substantially transparent to diffracted light in an image from the reflection hologram at about <45° to a normal to the hologram surface of the reflection hologram.

10. The hologram display apparatus of claim 6, wherein a spectral reflector is formed from a multi-layer thin-film coating on a substrate near to or bonded to an image hologram, or is coated directly onto the reflection hologram, and wherein the spectral reflector is formed from a holographic optical element.

11. The hologram display apparatus of claim 6, wherein the spectral reflector is mounted either immediately in front of or behind a formed hologram to further increase contrast.

12. The hologram display apparatus of claim 1, wherein the spectral reflector is a flat optic.

* * * * *